(12) United States Patent
Motsanos (10) Patent No.: US 10,316,943 B2
(45) Date of Patent: Jun. 11, 2019

(54) POWER TRANSFER DEVICE

(71) Applicant: Pyramid Mekaniska Konsult HB, Norrkoeping (SE)

(72) Inventor: Panagiotis Motsanos, Norrkoeping (SE)

(73) Assignee: Giottis Motsanos Enskild Firma, Norrköping (SE)

( * ) Notice: Subject to any disclaimer, the term of this patent is extended or adjusted under 35 U.S.C. 154(b) by 889 days.

(21) Appl. No.: 14/759,941

(22) PCT Filed: Dec. 18, 2013

(86) PCT No.: PCT/SE2013/051549
§ 371 (c)(1),
(2) Date: Jul. 9, 2015

(87) PCT Pub. No.: WO2014/109692
PCT Pub. Date: Jul. 17, 2014

(65) Prior Publication Data
US 2015/0354677 A1 Dec. 10, 2015

(30) Foreign Application Priority Data
Jan. 10, 2013 (SE) ...................... 1350019

(51) Int. Cl.
*F16H 19/00* (2006.01)
*B66D 3/08* (2006.01)
(Continued)

(52) U.S. Cl.
CPC ............. *F16H 19/005* (2013.01); *B66D 3/08* (2013.01); *F16H 19/0622* (2013.01); *F16H 35/00* (2013.01); *Y10T 74/18856* (2015.01)

(58) Field of Classification Search
CPC ........... B66D 3/06; B66D 3/08; F16H 19/005; F16H 19/0622; F16H 35/00; Y10T 74/18856
See application file for complete search history.

(56) References Cited

U.S. PATENT DOCUMENTS

| 2,067,942 A | * | 1/1937 | Nichols | .................... B66D 3/06 254/285 |
| 2,068,638 A | * | 1/1937 | Nichols | .................... B66D 3/06 254/398 |

(Continued)

FOREIGN PATENT DOCUMENTS

| EP | 2159448 A1 | 3/2010 |
| GB | 625431 A | 6/1949 |

(Continued)

OTHER PUBLICATIONS

International Search Report for corresponding patent application No. PCT/SE2013/051549 dated Apr. 28, 2014.
(Continued)

*Primary Examiner* — Michael E Gallion
(74) *Attorney, Agent, or Firm* — Renner, Otto, Boisselle & Sklar, LLP (57) ABSTRACT

This is achieved according to the present invention by a torque/power transfer device comprising a main frame, a driving member (2), a driven member (3), and at least two pulley systems. Each pulley system comprises at least one stationary pulley (11a, 11b), which is stationary relative to the main frame, at least one movable pulley, which is movable relative to the main frame, a first wire connected to the driving member (2) and running over the at least one stationary pulley and the at least one movable pulley and a second wire operatively connected to the at least one movable pulley at one end and to the driven member (3) at its other end, wherein the second wire is running via a station-
(Continued)

ary regulator. The first wire of each pulley system is connected to a common point of the driving member and the second wire of each pulley system is operatively connected to a common eccentric point of the driving member. The regulators and the driven member are arranged relative to each other so that a centre of rotation for the driven member is arranged on an imaginary first line between the regulators of the both pulley systems. The imaginary first line has an angle relative the horizontal plane determined based on the radius of the driven member and a distance between the centre of rotation and respective regulator.

10 Claims, 5 Drawing Sheets

(51) Int. Cl.
*F16H 35/00* (2006.01)
*F16H 19/06* (2006.01)

(56) References Cited

U.S. PATENT DOCUMENTS

| | | | | |
|---|---|---|---|---|
| 3,044,312 A * | 7/1962 | Hall | ............ | B66D 3/02 |
| | | | | 211/103 |
| 3,343,810 A * | 9/1967 | Parnell | ............ | B63B 21/16 |
| | | | | 254/273 |
| 3,442,565 A * | 5/1969 | Boyce | ............ | A47B 53/00 |
| | | | | 211/113 |
| 5,421,468 A * | 6/1995 | Wright | ............ | B66C 11/16 |
| | | | | 212/250 |
| 5,931,265 A * | 8/1999 | Hollowell | ............ | B66B 7/062 |
| | | | | 187/249 |
| 8,636,265 B1 * | 1/2014 | Soot | ............ | B66D 1/39 |
| | | | | 254/334 |
| 2005/0104053 A1 * | 5/2005 | Miller | ............ | B66D 3/18 |
| | | | | 254/385 |
| 2013/0090194 A1 * | 4/2013 | Ferlay | ............ | B25J 9/104 |
| | | | | 474/64 |
| 2013/0168345 A1 * | 7/2013 | Hey | ............ | B66C 23/52 |
| | | | | 212/276 |
| 2018/0038173 A1 * | 2/2018 | Nunes | ............ | B66C 13/10 |

FOREIGN PATENT DOCUMENTS

| | | |
|---|---|---|
| JP | 11335088 A | 12/1999 |
| SE | 535281 C2 | 11/2011 |

OTHER PUBLICATIONS

Written Opinion for corresponding patent application No. PCT/SE2013/051549 dated Apr. 25, 2014.
International Preliminary Report on Patentability for corresponding patent application No. PCT/SE2013/051549 dated Mar. 3, 2015.
Supplementary European Search Report for corresponding Patent Application No. 13870462.2 dated Feb. 7, 2017.
Examination Report for corresponding Patent Application No. 13870462.2 dated Feb. 7, 2017.

* cited by examiner

POWER TRANSFER DEVICE

This application is a national phase of International Application No. PCT/SE2013/051549 filed Dec. 18, 2013 and published in the English language.

TECHNICAL FIELD

The present innovation relates to a torque or power transfer device comprising a main frame, a driving crankshaft, a driven crankshaft, and a pulley system.

The present invention further relates to a method for transferring a torque provided by a driving crankshaft to a driven crankshaft.

BACKGROUND ART

Torque/power transfer systems are well known in the art. For example, EP 2159 448 describes a pulley driver system comprising an endless belt trained around a driving pinion and a driven pulley.

SE 535281 describes a device and a method for transferring a shortened working distance through the system in relation to the prior art as stated above. This by means of a torque/power transfer device comprising a main frame, a driving crankshaft, a driven crankshaft and at least two pulley systems. Each pulley system comprises at least one stationary pulley, which is stationary relative to the main frame, at least one movable pulley, which is movable relative to the main frame, a first wire connected to the driving crankshaft and running over the at least one stationary pulley and the at least one movable pulley and a second wire operatively connected to the at least one movable pulley at one end and to the driven crankshaft at its other end. The device is characterized in that, the first wire of each pulley system is connected to a common eccentric point of the driving crankshaft and in that the second wire of each pulley system is operatively connected with a common eccentric point in the driving crankshaft.

SUMMARY OF THE INVENTION

A general object of the present innovation is to further improve the above mentioned device.

This is achieved according to the present invention by means of a torque/power transfer device comprising a main frame, a driving member a driven member and at least two pulley systems. Each pulley system comprises at least one stationary pulley, which is stationary relative to the main frame, at least one movable pulley, which is movable relative to the main frame, a first wire connected to the driving member and running over the at least one stationary pulley and the at least one movable pulley and a second wire operatively connected to the at least one movable pulley at one end and to the driving member at its other end, which second wire is running via a stationary regulator. The first wire of each pulley system is connected to a common point of the driving member and the second wire of each pulley system is operatively connected with a common eccentric point of the driving member. The regulators and the driven member are arranged in relation to each other so that a centre of rotation for the driven member is arranged on an imaginary first line between the two regulators of the both pulley systems. The imaginary first line has a first angle in relation to the horizontal plane determined based on the radius of the driven member and a distance between the centre of rotation and the respective regulator.

Further embodiments are described in the accompanying claims.

The dimension of the driving crankshaft and the number of stationary and movable pulleys determines the dimensions of the driven crankshaft in the transfer device.

The inclusion of at least two pulley systems in the torque/power transfer device makes it possible to provide high forces in confined spaces. The pulley systems continuously work one at a time, each pulling the driven crankshaft to a 180° rotation so as to together pull the driven crankshaft a full rotation 360° Thereby, the working distance can be shortened in comparison to conventional systems known today so as to provide the same efficiency.

Thus, the torque transfer device is capable of providing an increased force applied pulling at the eccentric point of the driven crankshaft, while retaining the rotation speed as compared to that of the driving crankshaft. This is particularly advantageous and of paramount importance when driving an electric generator because of the synchronisation and harmony in the system.

In this context, a "pulley" is understood to be rotatable relative to any arrangement carrying it. Hence, a "moveable pulley" means that the rotational axis of the pulley is movable. The term "pulley" should be understood to encompass any structure which is capable of deflecting a wire. Hence, a pulley as understood herein may have the form of a drum, sheave or wheel. The pulley may, but need not, have a circumferential groove for receiving the wire.

The term "crankshaft" should be understood as encompassing any structure capable of transferring a rotary or elliptical motion into a reciprocating linear motion and vice versa.

A "wire" may be any type of wire, string or even a blended rod, capable of transferring a tension force, but effectively not a compressive force, in its longitudinal direction.

The "main frame" may be a frame, housing or any structure effectively providing a support for the stationary pulleys.

The first wires may be attached to the main frame, to the movable pulley or to a movable sub frame to which the movable pulley is attached in dependence of the configuration of the pulleys.

The second wires may be attached to the movable pulley or to a movable sub frame to which the movable pulley is attached.

It may be advantageous if the pulley systems are balanced, i.e. having approximately the same weight and frictional resistance. Therefore, in one example, the same material is used in all pulleys.

In accordance with one option, the movable pulley(s) of each pulley system may be arranged on a respective movable sub frame, which is movable relative to the main frame.

In one option, each pulley system may comprise at least two stationary pulleys.

In one option, each pulley system may comprise at least two movable pulleys.

The movable pulleys may be movable in a substantially vertical direction.

The invention further comprises a torque/power transfer system, comprising a torque/power transfer device as described above and an electric generator connected to the driven crankshaft. Alternatively, the driven crankshaft is used as a tool for application on any type of axes that needs torque/power for rotation.

The torque/power transfer system may further comprise a power source in the form of a drive motor or a turbine arranged operatively connected to the driving crankshaft. The motor may be driven by e.g. electricity, fossil fuel or renewable fuel, etc. The turbine may be driven by e.g. wind, steam or water flow, etc.

DETAILED DESCRIPTION

Figure 1:
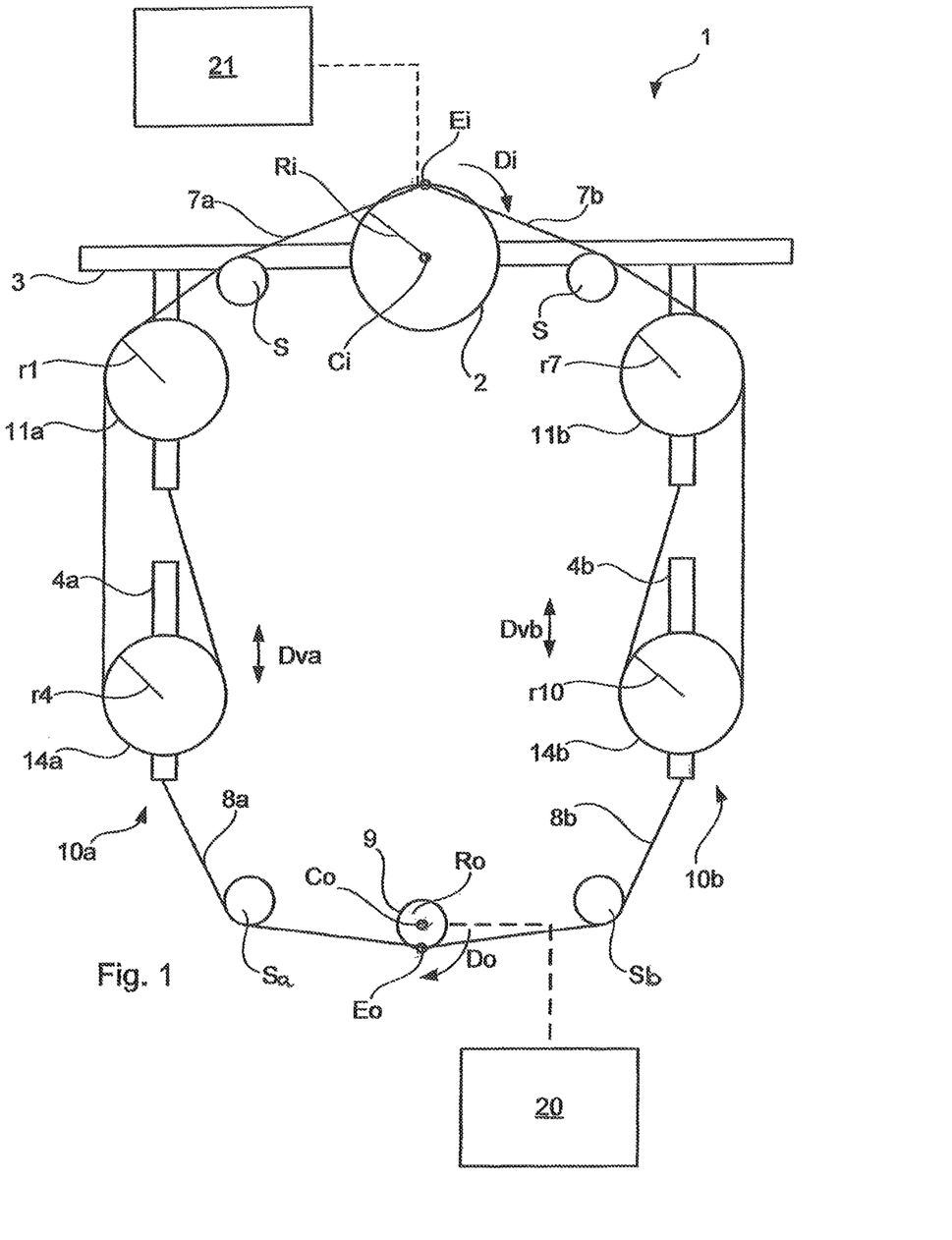
FIG. 1 schematically illustrates a first embodiment of torque/power transfer system 1.

FIG. 1 schematically illustrates a torque/power transfer device 1 according to a first embodiment of the present disclosure.

An incoming crankshaft 2 is connected to a power source 21, arranged to provide a rotary motion to the incoming crankshaft 2. The power source is for example an electric motor a combustion engine, or a turbine (driven by e.g. wind, water, steam, photolytic). The incoming crankshaft 2 has a centre of rotation Ci, and an eccentric point Ei, which is at a radial distance Ri from the centre of rotation Ci.

The torque/power transfer device 1 further comprises a first pulley system 10a and a second pulley system 10b. In the illustrated example, each pulley system comprises one stationary pulley 11a, 11b and one movable pulley 14a, 14b. Each pulley system comprises at least one stationary pulley 11a, 11b and at least one movable pulley 14a, 14b.

The stationary pulley 11a of the first pulley system 10a has a radii r1. 11b have first radii r1. The stationary pulley 11b of the second pulley system 10b has a second radii r7. Typically, but not necessarily, the first radii r1 would be equal to the second radii r7. The movable pulley 14a of the first pulley system 10a has a first radii r4. The movable pulley 14b of the second pulley system 10b has a second radii r10. Typically, but not necessarily, the first radii r4 would be equal to the second radii r10.

The torque/power transfer device may further comprise a main frame 3, to which the incoming crankshaft 2 may be rotatable mounted. Further, the stationary pulleys 11a, 11b may be attached to the main frame 3. The movable pulley 14a, 14b of each pulley system 10a, 10b may be attached to a respective sub frame 4a, 4b, which is movable relative to the main frame 3, which will be described in detail below.

In the shown example, a first end of a first wire 7a, 7b for each pulley system 10a, 10b is in attached to the eccentric connecting point Ei of the incoming crankshaft 2 A second end of each respective first wire 7a, 7b is in the shown example connected to the main frame. Each first wire 7a, 7b is arranged to turn over its associated stationary pulley 11a, 11b and its associated movable pulley such that the movable pulley 14a, 14b is moved towards the stationary pulley 11a, 11b when the first wire 7a, 7b is pulled at its first end and vice versa. The movement of the wire may be assisted by a guide arrangement S.

As stated above, in the shown example the first end of each respective first wire 7a, 7b is attached to the attachment point Ei. In accordance with this example, the first wires 7a, 7b may be formed by a single wire having a connecting arrangement at Ei Alternatively, the first ends of the respective first wires are attached to different attachment points at the incoming crankshaft. In the example wherein the first wires 7a, 7b are attached to the same connecting point Ei, the pulley system 10a, 10b will operate in counter phase, i.e. when the movable pulley of the first pulley system is moving towards its associated stationary pulley (the first pulley system is lifted) then the movable pulley of the second pulley system is moving in a direction apart from its associated stationary pulley (the second pulley system is lowered). Accordingly, the rotational movement of the crankshaft 2 provides a continuous reciprocating movement of the movable pulleys 14a, 14b of the first and second pulley systems 10a, 10b.

Further, the second end may for example be connected to the movable frame 4a, 4b instead of in the main frame. This may be applicable in a case where the device involves two stationary pulleys and only one movable pulley or more generally in a case wherein there is an odd number of pulleys in the pulley system.

An outgoing crankshaft 9 is connected to a power drain 20, which may be an electric generator. The outgoing crankshaft 9 has a centre of rotation Co, and an eccentric point Eo, which is at a radial distance Ro from the centre of rotation Co. The optimal theoretical distance of the lever of 9 outgoing crankshaft (between Co and Eo) lies somewhere in between 0<2Ro<1 meter.

A lever system x comprises one second wire 8a, 8b for each pulley system. Each second wire is in the illustrated example connected to the eccentric connecting point Eo of the outgoing crankshaft 9 at one end and to the movable pulley 14a, 14b (or movable frame 4a, 4b if any) of its associated pulley system 10a, 10b at its other end. Thereby, as the movable pulleys 14a, 14b (or frame 4a,4b) perform the reciprocating, counter-phase movement, the respective second wires 8a, 8b will pull alternately on the outgoing crankshaft 9 thereby causing it to rotate.

The second wires 8a, 8b may be formed by a single wire having a connecting arrangement at Eo.

The pulley systems 10a, 10b may be arranged such that the movement of the moveable pulleys 14a, 14b and any sub frame 4a, 4b takes place in a substantially vertical direction Dva, Dvb. The operation of the torque transfer device 1 will now be described more in detail with reference to an example in accordance with this arrangement.

Starting from a position where a first pulley system 10a is at its lowermost point, and the incoming crankshaft 2 rotating in a clockwise direction, the device 1 will operate as follows. An incoming torque/power Ti will provide a force on the first wire 7a. During the 180 degrees of rotation, the first wire 7a will be pulled 2Ri. With the system as illustrated in FIG. 1 having a single movable pulley, providing an advantage of 2, the movable pulley 14a will be lifted a distance corresponding 2Ri/2=Ri. The force provided on the incoming crankshaft will be supplemented by the force provided by the mass of the movable pulley 14b (and the frame 4b, if any) which will be free to fall by gravity.

With the movable pulley 14a is being lifted, the second wire 8a will be pulled to provide a force acting upon the outgoing crankshaft and the number of pulleys present device (actually the advantage provided by the pulley system) according to advantage=Ri/Ro.

Typically, the pulley system 10a, 10b should be as identical as possible, i.e. having the same weight and measurements. A plurality of deflection pulley S may be provided as illustrated to ensure that the wires 7a, 7b; 8a, 8b pulling on the crankshafts 9, 2 pull in optimal directions.

Figure 2:
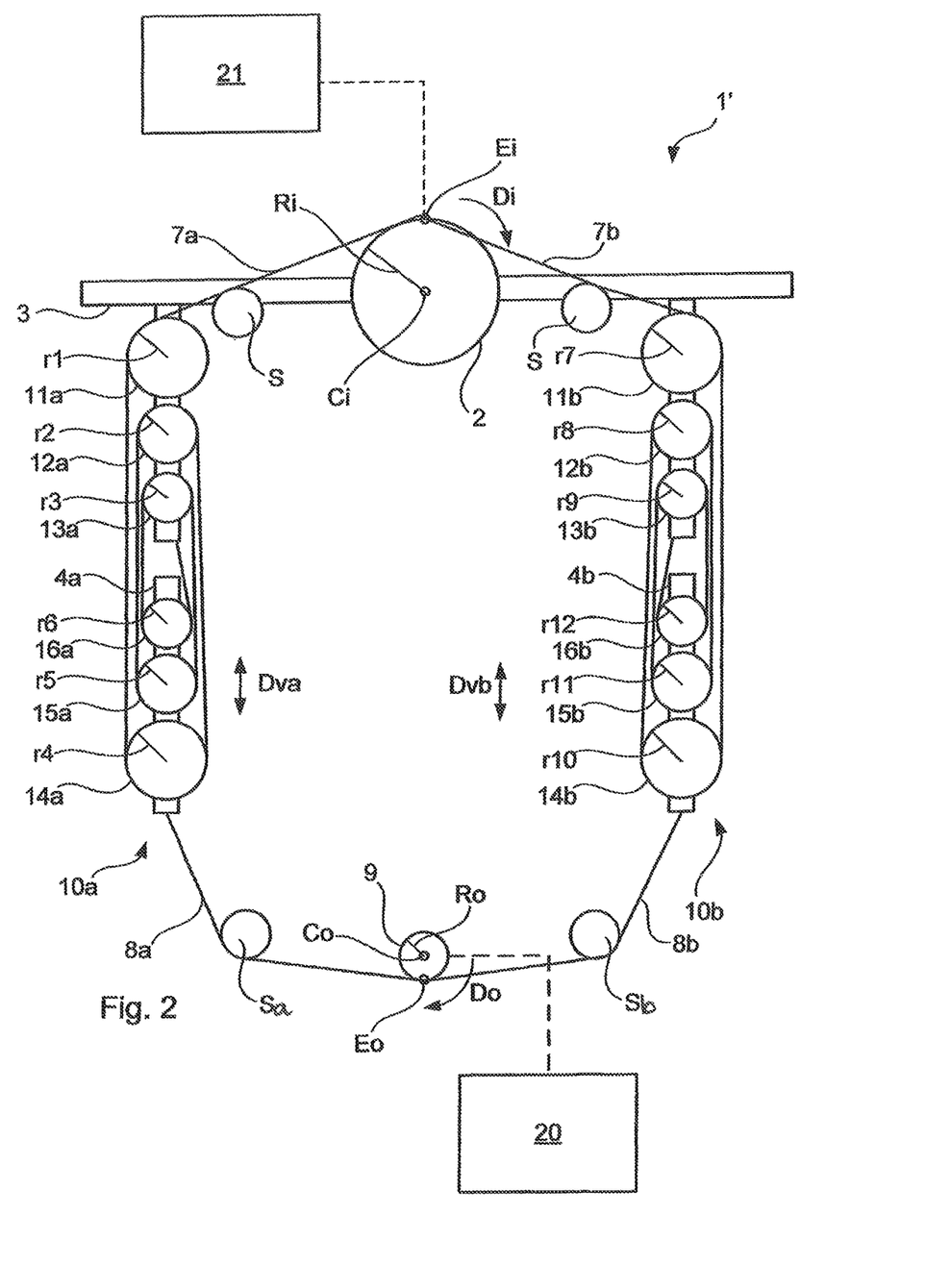
FIG. 2 schematically illustrates a second embodiment of torque/power transfer system 1'.

FIG. 2 schematically illustrates a second embodiment of a torque/power transfer device 1", wherein each pulley system 10a, 10b comprises a plurality of stationary pulleys and a plurality of movable pulleys. In this embodiment the number of stationary pulleys is equal to the number of movable pulleys. The movable pulleys are mounted substantially along a line on a common sub frame 4a. The stationary pulleys are also mounted along a line on the main frame. The respective first wires 7a turn around all the pulleys alternatively on a stationary pulley and alternatively on a movable pulley.

In the figure, each pulley system comprises six pulleys, tree of which 11a 12a, 13a; 11b, 12b, 13b being stationary and three of which 14a, 15a, 16a; 14b, 15b, 16b being movable. The stationary pulleys have radii r1, r2, r3; r7, r8, r9, where e.g. r1=r7; r2=r8 and r3=r9. The movable pulleys have the radii r4, r5, r6; r10, r11, r12, respectively, where e.g. r4=r10;

r5=r11 and r6=r12. With six pulleys in each pulley system, this embodiment would provide an advantage o 6. Hence Ro would be Ri/6.

Figure 3:
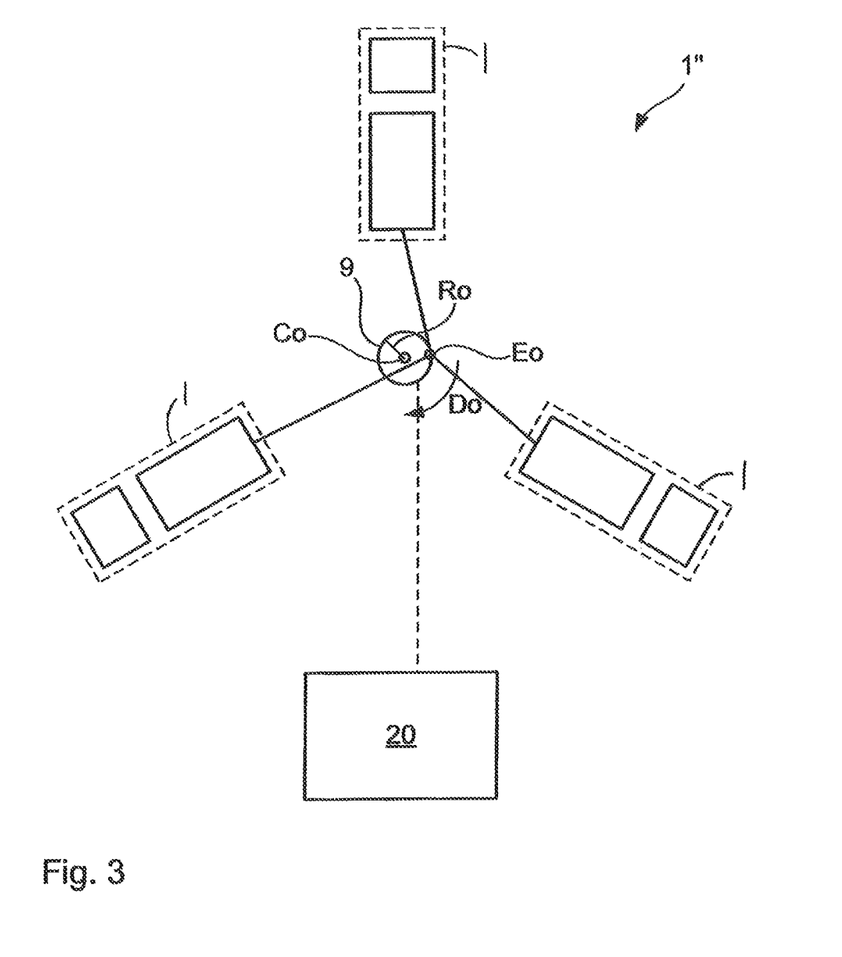
FIG. 3 schematically illustrates a first embodiment of torque/power transfer system assembly 1".

FIG. 3 schematically illustrates a third embodiment of a torque/power transfer device assembly 1''', where three torque/power transfer devices 1 are arranged to act on a common single outgoing crankshaft 9. Each torque/power transfer device 1 will be connected to a respective power source 21 and arranged to pull 120 degrees on the outgoing crankshaft 9. Such a device 1" would typically require some further coordination mechanism to provide a drive scheme. It is envisaged that a drive scheme would allow for the torque/power transfer devices 1 to operate two by two, with the third torque/power transfer devices 1 being at rest. Hence each torque/power transfer device 1 would have an operating cycle of 120 degrees work stroke; 120 degrees return stroke and 120 degrees rest.

Figure 4:
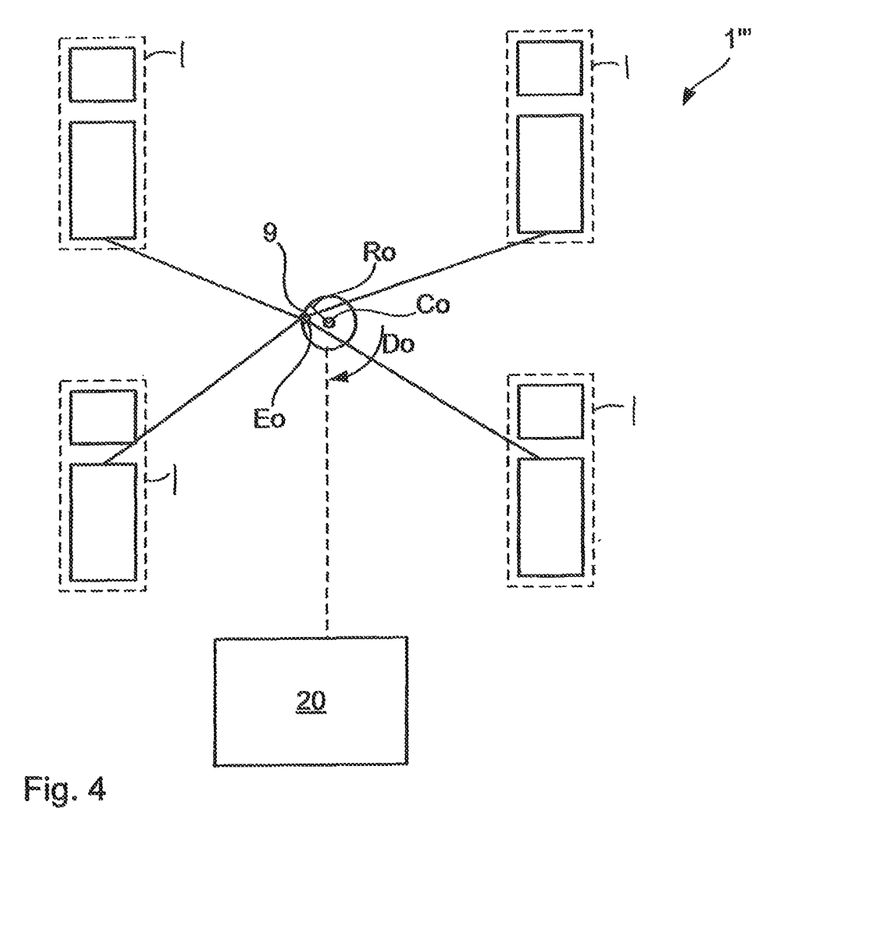
FIG. 4 schematically illustrates a second embodiment of torque/power transfer system assembly 1'".

FIG. 4 schematically illustrates a fourth embodiment of a torque/power transfer device assembly 1'''', where torque/power transfer devices 1 are arranged to act on a common single outgoing crankshaft 9. Each torque/power transfer device 1 will be connected to a respective power source and arranged to pull 90 degrees on the outgoing crankshaft 9. Analogous to the device 1" of FIG. 3 each torque/power transfer device 1 would have an operating cycle of 90 degrees work stroke, 90 degrees return stroke and 180 degrees rest.

The outgoing crankshaft is in one example connected to an electric generator or connected to use as a tool for application on any type of axes that needs torque/power for rotation.

The pulleys may be mounted on separate geometric axes as illustrated herein. In the alternative, a pair of stationary or movable pulleys may be mounted on a common geometric axis. In such case, it may be advantageous to provide each pulley with a separate bearing system, such that the individual pulleys rotate independently of each other.

It is possible to provide embodiments with the same number of stationary and movable pulleys in each pulley system. However, it is also possible to provide embodiment with more or fewer stationary pulleys than movable pulleys.

It is preferred to use pulley and wire materials which minimize friction and wear.

It is preferred that the effective radius Ro of the outgoing crankshaft be made as small as possible. The length of the lever should be; 0<2Ro<1 meter.

Figure 5:
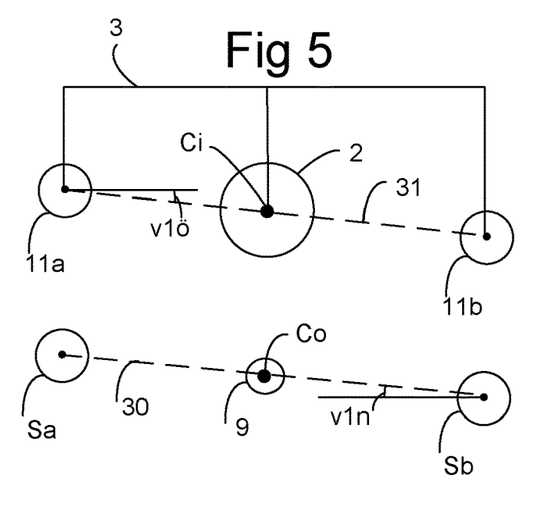
FIG. 5 schematically illustrates the geometry of a torque/power transfer system according to a first embodiment.

In FIG. 5 the torque/power transfer device comprises a main frame 3 (shown schematically in FIG. 5), a driving member 2 and a driven member 9. In one example, the driven member and/or the driving member is a crankshaft. In an alternative example, the driving member and/or the driven member comprises a crankshaft and a planetary gear arranged on the crankshaft, wherein respectively planetary gear is adapted to operate in analogy to the corresponding crankshaft.

The driving member and/or the driven member can instead comprise a permanent magnet, wherein respectively permanent magnet is adapted to operate in analogy with an imaginary corresponding crankshaft.

The torque/power transfer device comprises two pulley systems. Each pulley system 10a, 10b comprises at least a stationary pulley 11a, 11b, which is stationary relative to the main frame (3). In the schematic illustration in FIG. 5 only a stationary pulley is illustrated. Each pulley system 10a, 10b also comprises a moveable pulley, which is movable in relation to the main frame. A first wire (not shown in FIG. 5) is connected to the driving member 2 and is running over the at least on stationary pulley 11a, 11b and said at least one movable pulley. In one example, the first wire is running between the corresponding first stationary pulley 11a, 11b and the driving member without deflection. A second wire (not shown in FIG.5) is operatively connected to said at least one movable pulley ate one end and with the driven member 9 at the other end. Respectively second wire is running via a first stationary regulator Sa, Sb. The first wire of each pulley system 10a, 10b is connected to a common point (Ei) of the driving member. The second wire of each pulley system is operatively connected to a common eccentric point (Eo) of the driving member.

The regulators Sa, Sb and the driven member (9) are arranged in respect to each other so that a centre of rotation (Co) for the driven member 9 is arranged on an imaginary first line (30) between the both regulators Sa, Sb of the pulley systems. The imaginary first line 30 has a first angle v1n in relation to the horizontal plane determined based on the Gaussian curvature and Gaussian mathematical principles.

Figure 6:
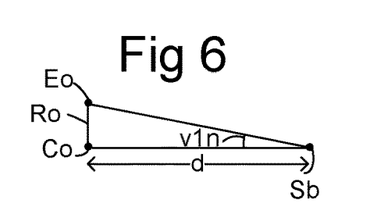
FIG. 6 schematically illustrates how an angle in the torque/power transfer system in FIG. 5 can be calculated.

The first angle v1n can be defined as the tangent for the radius of the driven member 9 and a distanced between the centre of rotation Co and respective regulator Sa, Sb. This is illustrated in FIG. 6.

The driving member 2 and the first stationary pulleys 11a, 11b of the both pulley systems are arranged in relation to each other so that the centre of rotation (Ci) for the driving member 2 is at an imaginary first line 31 between the first stationary pulleys 11a, 11b of the both pulley systems. The imaginary first line (31) between the first pulleys 11a, 11b has a first angle v1ö in relation to the horizontal plane determined harmonized with the first angle (v1n) for the first imaginary line (30) between the regulators Sa, Sb. The value of the first angle v1ö on the driving side of the device can be determined in the same manner as the first angle v1n on the driven side of the device based on the driving member's radius (i.e. the distance between the centre of rotation Ci and the eccentric point $E_i$) and based on the Gaussian curvature and Gaussian mathematical principles. In this embodiment, the first pulleys 11a, 11b and the regulators Sa, Sb are forming the corners in a parallelogram.

In one example, the calculations above are based on an imaginary first line for the driving side respectively the driven side of the device between the centre of the first stationary pulleys 11a, 11b and the centre of the regulators Sa, Sb. With the positioning of the centre for the driving member and the driving member along the first line on the driving side respectively the driven side, the first stationary pulleys 11a, 11b and the regulators Sa, Sb form the corners in a parallelogram. With this configuration for 360 degrees according to the Gaussian curvature and the Gaussian mathematical principles with a linear movement.

Figure 7:
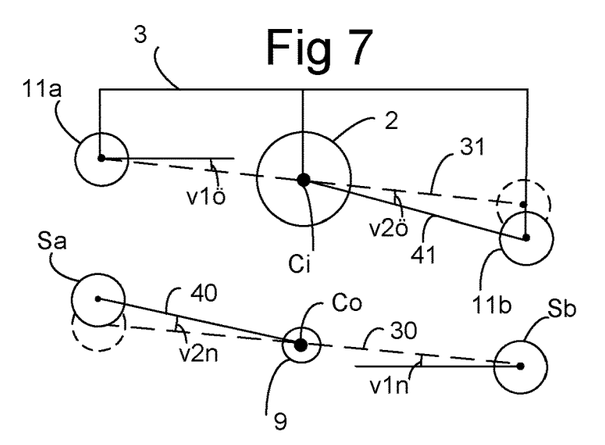
FIG. 7 schematically illustrates the geometry of a torque/power transfer system according to a second embodiment.

In FIG. 7 is, in a further embodiment, the upper regulator Sa moved vertically upwards and the lower first pulley 11b is moved vertically downwards in relation to the device described in connection to FIG. 5. The first stationary pulleys 11a, 11b, the regulators Sa, Sb, the centre of rotation of the driving member 2 and the centre of rotation of the driven member 9 form the corner in a hexagon. With this geometry, the device can be configured for 720 degrees according to Lorentz symmetry with a linear movement.

In FIG. 7 the upper regulator Sa is displaced vertically upwards in relation to the first line 30 so that a second angle v2n between an imaginary second line between the upper regulator Sa and the centre of rotation for the driven member Co and the imaginary first line 30 between the regulators (Sa, Sb) is determined according to Lorentz symmetry to utilize the Newton Brachistochrone effect.

The lower first pulley 11b is further moved vertically downwards in relation to the imaginary first line v1ö between the two first stationary pulleys 11a, 11b in the respectively pulley systems so that an imaginary second upper angle v2ö between an imaginary second line, between the lower first stationary pulley 11b and a centre of rotation Ci for the driving member, and the imaginary upper first line is determined in harmony with the second lower angle v2n.

In one example is a working distance S for the driving member less than 1 meter, wherein the working distance for the embodiment with a input/output crankshaft is determined as $S=2R_i\pi$.

For the both above described synchronizing embodiments five variables are used according to the Lorentz calculation model: x, y, z, mass and space time. Here Lorentz covariance is applied, which is the key property in the space time, extra speed and, for the device, extra torque.

The rectilinear and/or linear movement between the points in the independent variable working distance $0<S<1$.

The Lorentz symmetry and the Lorentz covariance are important for the space time and the spatial separation between the events in the independent variable working distance. The configuration according to Lorentz increases the torque on the device as described above. The torque can further be increased independently of mass due to the selected speed on the driving member respectively the driven member that shall be harmonised with the rotational movement, which gives greater power which in turn gives a greater torque.

The straight and linear movements can be independent of each other or a combination of the desired performance of the both effects, depending on which of the two above described configurations that is used.

In the cases where a permanent magnet and/or a planetary gear is used as driving/driven member in the device, the device is dimensioned according to the calculations for a crankshaft mentioned above. Then the planetary gear and/or the permanent magnet is caused to operate with a rectilinear and/or linear movement with desired working distance (S).

In one example, respectively stationary pulley 11a, 11b has a diameter based on the gravity. The diameters are for example in the interval 0.09 to 0.1 meter. Also the diameter for respectively last pulley 14a, 14b can be dimensioned based on the gravity.

Relativity suggests that the space time is curved. Further, there are different opinions about the origin of the mass. In the tool, the mass arises by the inert moment of inertia contained in a generator and that is distributed on the number of blocks contained in the tool. For example, 100 Nm are distributed as 25 Nm on each block that is in operation in a system with four operating blocks. The greater the mass, the greater the efficiency at constant speed. If the speed is increased with the same mass, the efficiency is increased and thus the efficiency of the tool at the same given working distance. There are grounds to put the gravity out of action in a "frame work" for moment of inertia that are constant and that is made pursuant to a correct rectilinear movement or linear movement. Expressed in another way, all inertial systems are in a state of rectilinear or linear movement in respect to each other. In the linear movement, the Brachistochrone effect can be utilized in combination with the sizes of the blocks to decrease the influence of gravity. Thereby a state is obtained, wherein the pulley system, i.e. the blocks, operate in a friction free state by the Brachistochrone effect that defines the gravity according to Newton and Lorentz.

The invention claimed is:

1. A torque/power transfer device comprising
a main frame,
a driving member,
a driven member,
at least two pulley systems, wherein each pulley system comprises at least a stationary pulley, which is stationary relative to the main frame, at least a movable pulley, which is movable relative to the main frame, a first wire, connected to the driving member and running over the stationary pulley and the movable pulley, and a second wire, operatively connected to the movable pulley at one end and with the driven member to the other end, which second wire is running via a stationary regulator,
wherein the first wire of each pulley system is connected to a common point of the driving member and wherein the second wire of each pulley system is operatively connected to a common eccentric point of the driven member,
wherein the stationary regulators of the two pulley systems and the driven member are arranged in relation to each other so that a centre of rotation for the driven member is arranged on an imaginary lower first line between the stationary regulators of the two pulley systems,
wherein said imaginary lower first line has a first lower angle in relation to a horizontal plane determined based on the radius of the driven member and a distance between the centre of rotation and a lower stationary regulator of the stationary regulators,
wherein the stationary pulleys of the two pulley systems and a centre of rotation for the driving member are arranged in relation to each other so that the centre of rotation for the driving member is arranged on an imaginary upper first line and between the stationary pulleys of the two pulley systems, and
wherein said imaginary upper first line has a first upper angle in relation to the horizontal plane determined in harmony with the first lower angle of the imaginary lower first line between the stationary regulators, wherein the first lower angle is defined as the tangent for the radius of the driven member and a distance between the centre of rotation of the driven member and the lower stationary regulator, and wherein an upper stationary regulator, of the stationary regulators, is displaced vertically upwards in relation to the imaginary lower first line so that a second angle between an imaginary lower second line, between the upper stationary regulator and the centre of rotation for the driven member, and the imaginary lower first line, between the regulators, is formed.

2. The torque/power transfer device as claimed in claim 1, wherein a lower first stationary pulley of the stationary pulleys is moved vertically downwards in relation to the imaginary upper first line, between the first stationary pulleys, so that an imaginary second upper angle between an imaginary upper second line, between the lower first stationary pulley and the centre of rotation for the driving member, and the imaginary upper first line is determined in harmony with the second lower angle.

3. The torque/power transfer device as claimed in claim 1, wherein a working distance S for the driving member and the driven member is 0<S<1 meter.

4. The torque/power transfer device as claimed in claim 3, wherein the working distance S=2Riπ for a circular movement.

5. The torque/power transfer device as claimed in claim 1, wherein the driving member and/or the driven member is a crankshaft.

6. The torque/power transfer device as claimed in claim 1, wherein the driving member and/or the driven member comprises a crankshaft and a planetary gear, which is arranged on the crankshaft and which is formed with the eccentric point, wherein the respective planetary gear is adapted to execute a rectilinear and/or linear movement in analogy with the corresponding crankshaft.

7. The torque/power transfer device as claimed in claim 1, wherein the driving member and/or the driven member comprises a permanent magnet, which is formed with the eccentric point, wherein respectively permanent magnet is adapted to operate in analogy with an imaginary corresponding crankshaft with regard to execute the working distance.

8. The torque/power transfer device as claimed in claim 1, wherein the driving member and the driven member are adapted to execute a straight or a linear movement independently of each other.

9. The torque/power transfer device as claimed in claim 1, wherein said first stationary pulley and a last movable pulley have a diameter chosen based on the gravity.

10. The torque/power transfer device as claimed in claim 9, wherein the diameter is in the interval 0.09 to 0.1 meter.

* * * * *